US009456540B2

(12) United States Patent
Rees et al.

(10) Patent No.: US 9,456,540 B2
(45) Date of Patent: Oct. 4, 2016

(54) POWER TAKE OFF COUPLING ETC (75) Inventors: Samuel Ryan Rees, Sheffield South (GB); John R. Wade, Girton (GB)

(73) Assignee: Evolution Power Tools Limited, Sheffield South, Yorkshire (GB)

( * ) Notice: Subject to any disclaimer, the term of this patent is extended or adjusted under 35 U.S.C. 154(b) by 335 days.

(21) Appl. No.: 13/982,528

(22) PCT Filed: Jan. 24, 2012

(86) PCT No.: PCT/IB2012/050326
§ 371 (c)(1),
(2), (4) Date: Jul. 30, 2013

(87) PCT Pub. No.: WO2012/104745
PCT Pub. Date: Aug. 9, 2012

(65) Prior Publication Data
US 2013/0305851 A1 Nov. 21, 2013

(30) Foreign Application Priority Data
Jan. 31, 2011 (GB) .................................. 1101605.2

(51) Int. Cl.
*A01B 71/06* (2006.01)
*F16D 11/14* (2006.01)
(Continued)

(52) U.S. Cl.
CPC ............... *A01B 71/06* (2013.01); *F16D 11/08* (2013.01); *F16D 11/14* (2013.01); *F02B 63/04* (2013.01); *F02B 67/04* (2013.01)

(58) Field of Classification Search
CPC ...... A01B 71/00; A01B 71/06; A01D 69/08; F16D 11/08; F16D 11/14; F16D 11/04; F16D 23/10; F16D 1/10; F16D 1/108; F16D 1/116; F02B 67/04; F02B 63/04
See application file for complete search history.

(56) References Cited

U.S. PATENT DOCUMENTS 1,659,402 A * 2/1928 Lewis .......................... 192/69.7
2,259,733 A * 10/1941 Burtnett ........................ 475/208
(Continued)

FOREIGN PATENT DOCUMENTS

FR 2475625 A1 8/1981
JP 05052362 U 7/1993
(Continued)

OTHER PUBLICATIONS

International Application No. PCT/IB2012/050326, International Search Report, 6 pages, Aug. 6, 2012.

*Primary Examiner* — Paul N Dickson
*Assistant Examiner* — Timothy Wilhelm
(74) *Attorney, Agent, or Firm* — Perkins Coie LLP (57) ABSTRACT A power take off coupling for connecting an engine (20, 21) to a site accessory (16, 14, 17), comprises a resilient power transmission component (3) within the coupling; a latching device (8, 46, 9) to mechanically latch the accessory to the engine (20, 21), with a manually operable release handle (13) to effect unlatching. A power output shaft of the engine (20, 21) carries one half (5) of a dog clutch with the other half (7) carried by the accessory (16, 14, 17). An alignment arrangement comprises a first annulus ring (18) attached coaxially to an output shaft assembly of the engine (20, 21), and a second annulus ring (19) attached coaxially to an input shaft assembly of the accessory, with the two rings (18, 19) being of different diameters, such that one ring is adapted to be engaged coaxially within the other ring with close tolerances, such that the external periphery of the smaller ring (18) engages at least parts of the internal periphery of the larger ring (19) to provide for accurate coaxial alignment of the power output shaft of the engine (20, 21) and the power input shaft of the accessory.

19 Claims, 8 Drawing Sheets (51) Int. Cl.
  *F16D 11/08* (2006.01)
  *F02B 63/04* (2006.01)
  *F02B 67/04* (2006.01)

(56) References Cited

U.S. PATENT DOCUMENTS

| | | | | |
|---|---|---|---|---|
| 2,290,835 | A * | 7/1942 | Lorimor | 74/15.84 |
| 2,525,695 | A * | 10/1950 | Lombard | 464/158 |
| 2,792,900 | A * | 5/1957 | Howard | 180/53.1 |
| 2,892,524 | A * | 6/1959 | Sinclair | 192/69.91 |
| 3,070,393 | A * | 12/1962 | Silverberg et al. | 403/309 |
| 3,179,450 | A * | 4/1965 | Recker | 403/325 |
| 3,260,541 | A * | 7/1966 | Sadler et al. | 403/325 |
| 3,340,741 | A * | 9/1967 | Pietro | 74/15.63 |
| 3,342,079 | A * | 9/1967 | Yoshigaki et al. | 474/19 |
| 3,543,489 | A * | 12/1970 | Kasberger et al. | 56/10.4 |
| 3,722,307 | A * | 3/1973 | Campbell | 239/679 |
| 4,062,203 | A * | 12/1977 | Leonard et al. | 464/38 |
| 4,071,105 | A * | 1/1978 | von Allworden | 180/14.4 |
| 4,169,686 | A * | 10/1979 | Balensiefen et al. | 403/12 |
| 4,269,075 | A | 5/1981 | Crist et al. | |
| 4,350,123 | A * | 9/1982 | Kossek et al. | 123/2 |
| 4,402,626 | A * | 9/1983 | Recker | 403/328 |
| 4,572,343 | A * | 2/1986 | Boffelli | 192/56.41 |
| 4,609,053 | A * | 9/1986 | Ragnmark | 173/104 |
| 4,662,827 | A * | 5/1987 | Wiernicki | 417/363 |
| 4,679,675 | A * | 7/1987 | Hanks et al. | 192/69.5 |
| 4,900,181 | A * | 2/1990 | Geisthoff | 403/322.2 |
| 4,991,473 | A * | 2/1991 | Gotman | 81/475 |
| 5,031,741 | A * | 7/1991 | Otto | 192/69.3 |
| 5,127,220 | A * | 7/1992 | Jesrai et al. | 60/778 |
| 5,522,669 | A * | 6/1996 | Recker | 403/328 |
| 5,601,380 | A * | 2/1997 | Guthrie et al. | 403/359.3 |
| 5,907,970 | A * | 6/1999 | Havlovick et al. | 74/16 |
| 6,152,827 | A * | 11/2000 | Muller et al. | 464/160 |
| 6,195,973 | B1* | 3/2001 | Deni | 56/370 |
| 7,100,466 | B2 * | 9/2006 | Naude | 74/112 |
| 7,166,031 | B2 * | 1/2007 | Schott et al. | 464/137 |
| 7,220,075 | B2 * | 5/2007 | Herchenbach et al. | 403/57 |
| 7,278,502 | B2 * | 10/2007 | Trefz et al. | 180/53.1 |
| 7,997,362 | B2 * | 8/2011 | Herchenbach et al. | 180/14.4 |
| 8,240,449 | B2 * | 8/2012 | Shinagawa et al. | 192/223.3 |
| 8,348,041 | B2 * | 1/2013 | Elliott | 192/69.71 |
| 8,448,771 | B2 * | 5/2013 | Kuwashima | 192/108 |
| 8,795,130 | B2 * | 8/2014 | Forrest | 475/302 |
| 8,833,111 | B2 * | 9/2014 | Sanchez Dominguez et al. | 68/23.6 |
| 8,834,217 | B2 * | 9/2014 | Yoshimura | B63H 20/20 192/108 |
| 8,852,057 | B2 * | 10/2014 | Matsumoto | 477/181 |
| 8,881,882 | B2 * | 11/2014 | Pardee et al. | 192/84.91 |
| 8,973,728 | B1* | 3/2015 | York | 192/56.61 |
| 8,997,964 | B2 * | 4/2015 | Kasai et al. | 192/84.3 |
| 9,004,250 | B2 * | 4/2015 | Mori et al. | 192/69.6 |
| 9,038,800 | B2 * | 5/2015 | Dang | 192/93 A |
| 9,091,311 | B2 * | 7/2015 | Kasai | |
| 2008/0015034 | A1 * | 1/2008 | Downey | 464/39 |
| 2009/0103972 | A1* | 4/2009 | Herchenbach et al. | 403/14 |

FOREIGN PATENT DOCUMENTS

| | | |
|---|---|---|
| JP | 08242635 A | 9/1996 |
| JP | 2003056646 A | 2/2003 |
| WO | WO 03/046398 A1 | 6/2003 |

* cited by examiner

POWER TAKE OFF COUPLING ETC

FIELD OF THE INVENTION

This invention relates to a power take off coupling for a portable power unit, typically for site use, such as new build, refurbishment etc.

BACKGROUND OF THE INVENTION

A range of site equipment accessories—such as water pumps, air compressors, electric generators, power washers, vibrating pokers, chippers, shredders, vacuums, plate compactors etc—require a power drive, conventionally provided by a portable power unit in the form of a utility single cylinder engine. Current procedure is that it is necessary to hire, or buy, a variety of plant or equipment accessories, each of which is provided with its own utility engine which is often the most expensive component of the accessory. Consequently, purchasing, secure storing and maintaining a number of these accessories can place large financial, logistical and time burdens on their owner.

Typically, an average builder may purchase a number of utility engine powered accessories—for example, a generator, water pump and power washer, preferably with a "branded engine", i.e. a Honda or Mitsubishi etc. Usually the cost of a "branded engine" 2.5 kVA generator and 3" water pumps is of the order of £500+. Similar power washers can cost £600+. Overall, the cost of purchase can reach £1500-£2000.

The value of these accessories also requires secure overnight storage to deter theft.

The advantage of having a single, readily attachable and detachable power unit to drive a range of accessories has been recognized for decades. One proposal for carrying out this principle is described in U.S. Pat. No. 5,907,970. However, a critical aspect for success is the accurate alignment of a power output shaft of the engine and a power input shaft of the accessory to be driven, bearing in mind that connection and disconnection will normally be effected at building sites, and not in an assembly shop with the aid of jigs etc, otherwise an unacceptably short service life will result. Another proposal is described in U.S. Pat. No. 4,269,075. In addition, prior constructions have incorporated a dog clutch rather than a friction clutch, it being guesswork as to whether the teeth of the two clutch halves will mesh upon the accessory being presented to the power unit, or will foul one another, possibly, requiring repeated withdrawal and partial rotation of one clutch half with a view to achieving meshing. However, due it is believed to the difficulties and frustrations of satisfactory "on-site" connection, no system has to date, been marketed, as far as Applicants are aware.

OBJECT OF THE INVENTION

A basic object of the present invention is the provision of an improved power take off coupling capable of being coupled to a range of plant or equipment accessories to provide a torque drive.

SUMMARY OF A FIRST ASPECT OF THE INVENTION

According to a first aspect of the present invention, there is provided a power take off coupling for connecting a power unit to a site accessory, comprising (i) a resilient power transmission component within the coupling;
(ii) a latching device to mechanically latch the accessory to the power unit, with a manually operable release means operable when unlatching is required;
(iii) a power output shaft of the power unit carrying one half of a dog clutch with the other half carried by the accessory to be driven; and
(iv) a power unit to site accessory alignment arrangement comprising a first annulus ring attached coaxially to an output shaft assembly of the power unit, and a second annulus ring attached coaxially to an input shaft assembly of the accessory to be driven, with the two rings being of different diameters such that one annulus ring is adapted to be engaged coaxially within the other annulus ring with close tolerances, such that the external periphery of the smaller diameter annulus ring engages at least parts of the internal periphery of the larger diameter annulus ring to provide for accurate coaxial alignment of the power output shaft of the power unit and the power input shaft of the accessory.

SUMMARY OF A SECOND ASPECT OF THE INVENTION

According to a second aspect of the present invention, of independent significance, there is provided a dog clutch coupling to form part of a connection between a power unit and a site accessory, the power unit having a power output shaft carrying one half of a dog clutch with the other half carried by the accessory to be driven, wherein one dog clutch half is a spring biased such that should the dog clutch teeth, upon presentation for connection of the accessory to the power unit, foul one another rather than mesh, the spring biased, floating dog clutch half is able to retract, axially, against the spring bias firstly to permit completion of the connection and secondly upon sufficient rotation of one dog clutch half to permit meshing of the dog clutch teeth, with the spring biased dog clutch half being automatically advanced into meshing position under the spring bias.

ADVANTAGES OF THE ASPECTS OF THE INVENTION

The incorporation of the coupling features defined above between a portable power unit and an accessory required to be repeatedly coupled to, and de-coupled from the power unit, results in a system that, even with on-site, and relatively unskilled use, enable automatic alignment—and particularly radial alignment—of the drive and driven shafts to be achieved repeatedly, as the two annulus ring are engaged with one another, ensuring sufficiently accurate coaxial alignment of the output and input shafts, whilst the interposition of the resilient power transmission component compensates for any misalignment resulting from designed-in tolerances, it is clear that the tolerances between the two annulus ring must be such that they can be not only engaged, but also disengaged, with relative ease, rather than being a force fit with some resultant sticking. Furthermore, the mounting of one dog clutch half under spring bias, means that even if the accessory is presented to the power unit with the teeth of the dog clutch halves fouling one another, this is of no consequence as the floating dog clutch half is simply pushed inwardly against the spring bias, and connection and latching can continue as a single operation, the required meshing being automatically effected upon one dog clutch half being rotated e.g. upon starting of the engine i.e. by pulling the starter cord of the engine, by the spring bias automatically axially advancing the floating dog clutch half.

PREFERRED OR OPTIONAL FEATURES

Each dog clutch half is formed as a die casting.

The die castings are of aluminium alloy, preferably LM2.

Each dog clutch half is provided by a hub with dog clutch teeth on one side of the hub, and transmission teeth on the other side of the hub.

The dog clutch teeth number twelve, at 30° spacing.

The transmission teeth number six, at 60° spacing.

Whilst the floating dog clutch half could be either the drive or the driven hub, it is preferably the drive hub of the power unit.

The output shaft of the power unit terminates in a drive head having three tines at 120° spacing.

The tines are segmental in profile, having radial surfaces.

The resilient component is located between the drive head, and the dog clutch half of the power unit.

The resilient component is of rubber, of grade and formulation capable of accommodating repeated compression and relaxation and largely inert to temperature changes.

The resilient component comprises six teeth, at 60° spacing, with each tooth on one side being adapted to seat on one drive surface of a tine of the drive head.

The resilient component is fitted over a metallic component, which may be a sintered component.

The six transmission drive teeth of the dog clutch half of the power unit, are adapted to interdigitate with the teeth of the resilient component.

The teeth of at least one dog clutch half are tapered to aid mating interdigitation with the teeth of the other dog clutch half.

The tooth taper is asymmetrical, which allows the teeth to bottom-out on the taper, thus providing a backlash-free driving dog arrangement. The asymmetry provides the correct angles to overcome "cam-out" given that the driving torque is much greater than the reverse torque (that would be provided by an accessory with a large rotating mass that stores kinetic energy, such as an alternator).

The spring bias is provided by a coil compression spring located coaxially with respect to the output shaft, with one end of the coil spring engaging the drive head and the other end engaging the dog clutch half of the drive head.

The latching device is a positive mechanical latching device to hold the accessory firmly to the power unit, preventing movement both rotationally and axially.

The latching device effects automatic latching when an accessory is coupled to the power unit.

The latching device comprises an array of mounting holes, or projections provided in, or on the mounting plate for mating engagement with a corresponding plurality of projections or holes formed on or in an attachment plate of the accessory, with lead-in surfaces between the holes or projections to ensure both ease of engagement, and accurate alignment.

The latching means comprises three mounting holes and three projections.

The projections each comprise an enlarged head with a pilot, lead-in nose, with a neck portion behind the head.

The projections comprise two upper projections, and one lower projection.

The neck portion of each pin is engaged by a spring biased, and radially displaceable lever carried by a latching plate mounted on the power unit.

Manual means are provided for displacing the levers against their spring bias when detachment of the accessory from the power unit is required.

The power unit is housed in a frame.

The frame is wheeled and provided with a pair of handles to ease portability.

The frame comprises a main frame, and a sub-frame hinged to the main frame and moveable from a folded, storage/transportation position, to a deployed position.

The sub-frame is mechanically latched to the main frame at least in its deployed position.

Latching of the sub-frame to the main frame is provided by a pair of hand-operable levers at each side of the main frame.

The hand-operable levers effect latching by a camming effect.

The sub-frame is provided with two spaced-apart bearing bushes, whereby if the accessory is of substantial weight, its underside is provided with a pair of pins engageable in the bearing bushes to reduce the loading on the projections of the latching means.

BRIEF DESCRIPTION OF THE DRAWINGS

The two aspects of the invention will now be further described, by way of examples only, with reference to the accompanying drawings in which.

DETAILED DESCRIPTION OF THE DRAWINGS

Figure 1:
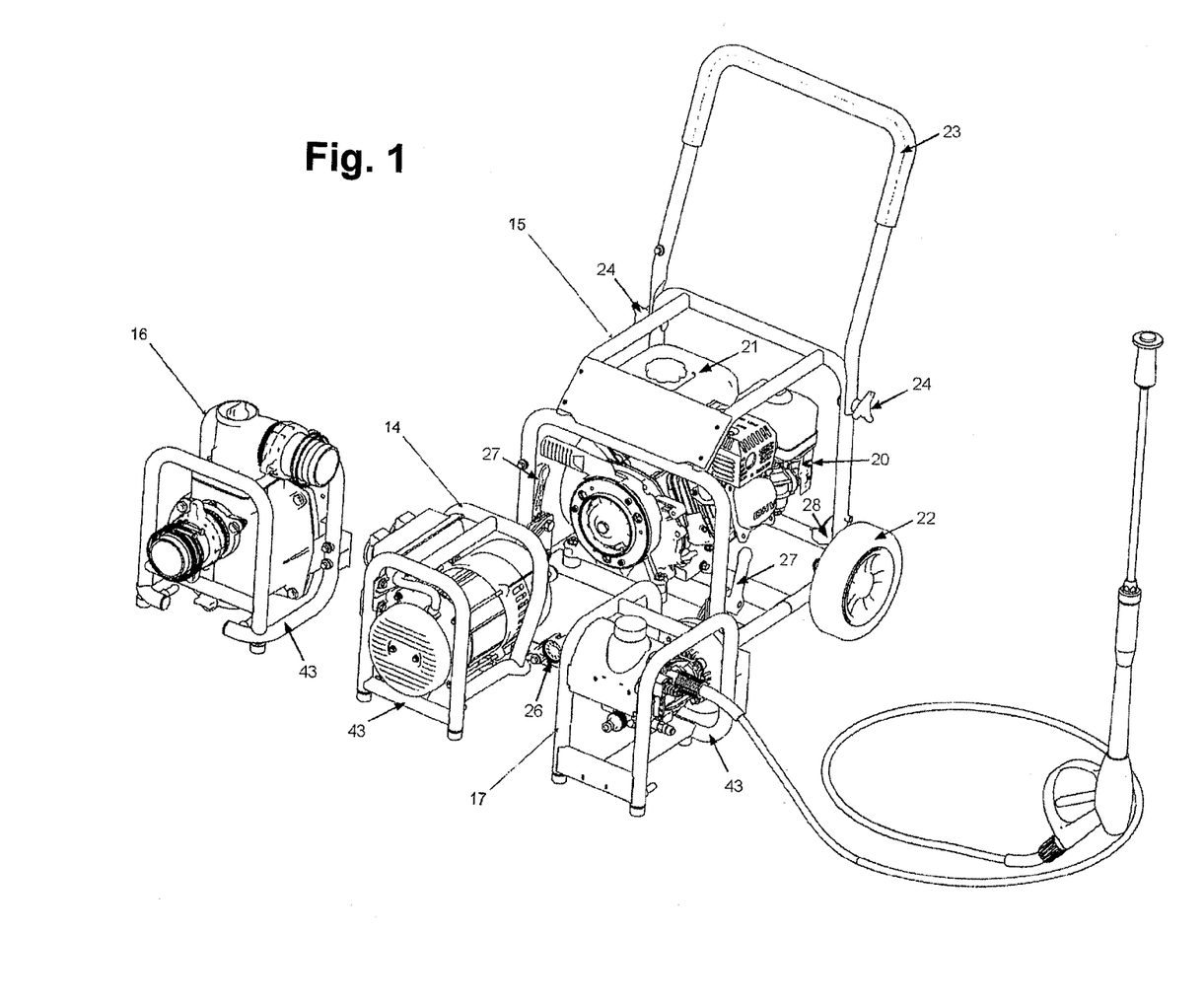
FIG. 1 is a perspective view of the front end one side of a portable power unit and three optional accessories capable of being attached to the power unit.

In FIG. 1 is shown a power unit 20 to which is to be releasably coupled for drive purposes, any one of a number of accessories, three being indicated at 16, 14 and 17, in the form of a water pump, a generator, and a high pressure pump respectively.

The power unit 20 is in the form of a single cylinder petrol engine 21 moulded in a tubular frame 15 provided with a pair of wheels 22 to aid transportation, a handle 23 secured by screws 24 which may be collapsed from the upright position illustrated to a horizontal position for more compact storage. The frame 21 is also provided at its front end with a U-shaped sub-frame 25 carrying two spaced-apart bushes 26 and being hingeable from the horizontal position illustrated to an upright compact storage/transportation position by suitable release and locking of two hand levers 27, one on each side of a front portion of the frame 21, whilst a manually operable brake mechanism 28 is effective on the wheels 22.

Figure 3:
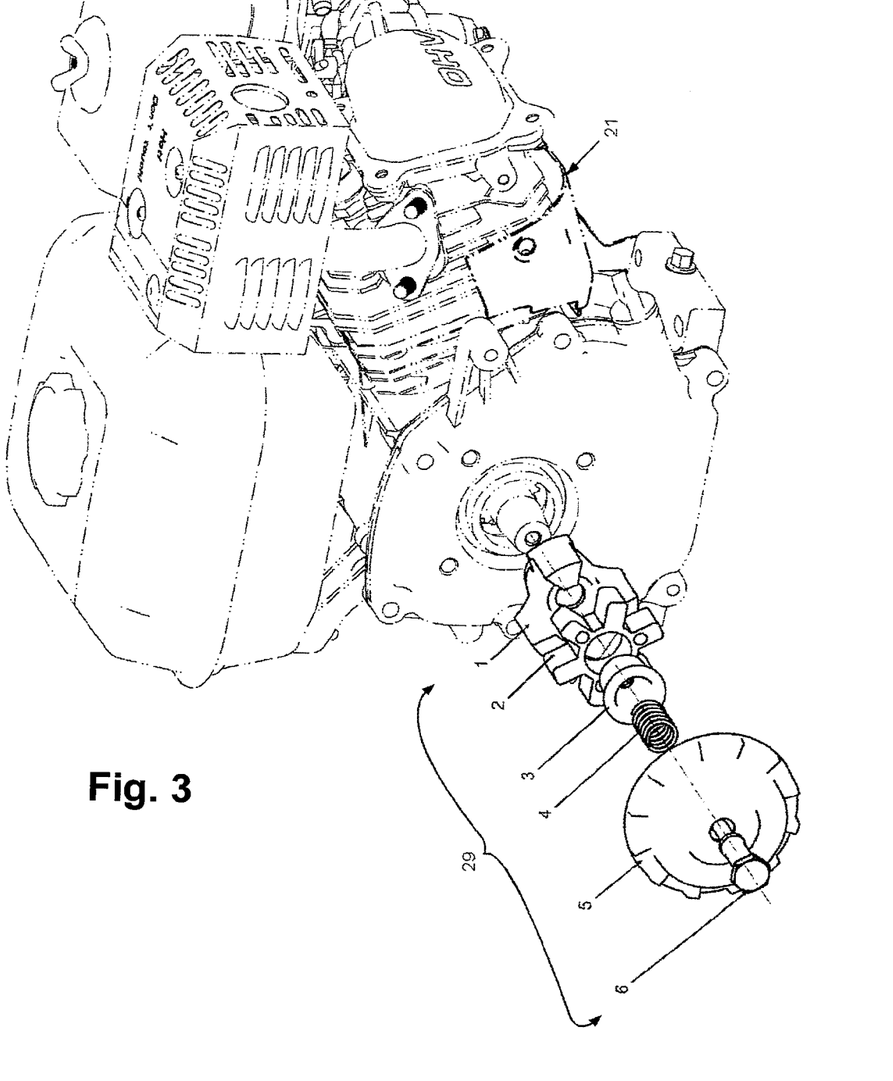
FIG. 3 is an exploded view from one end of one coupling half that is mounted on the power unit.
Figure 4:
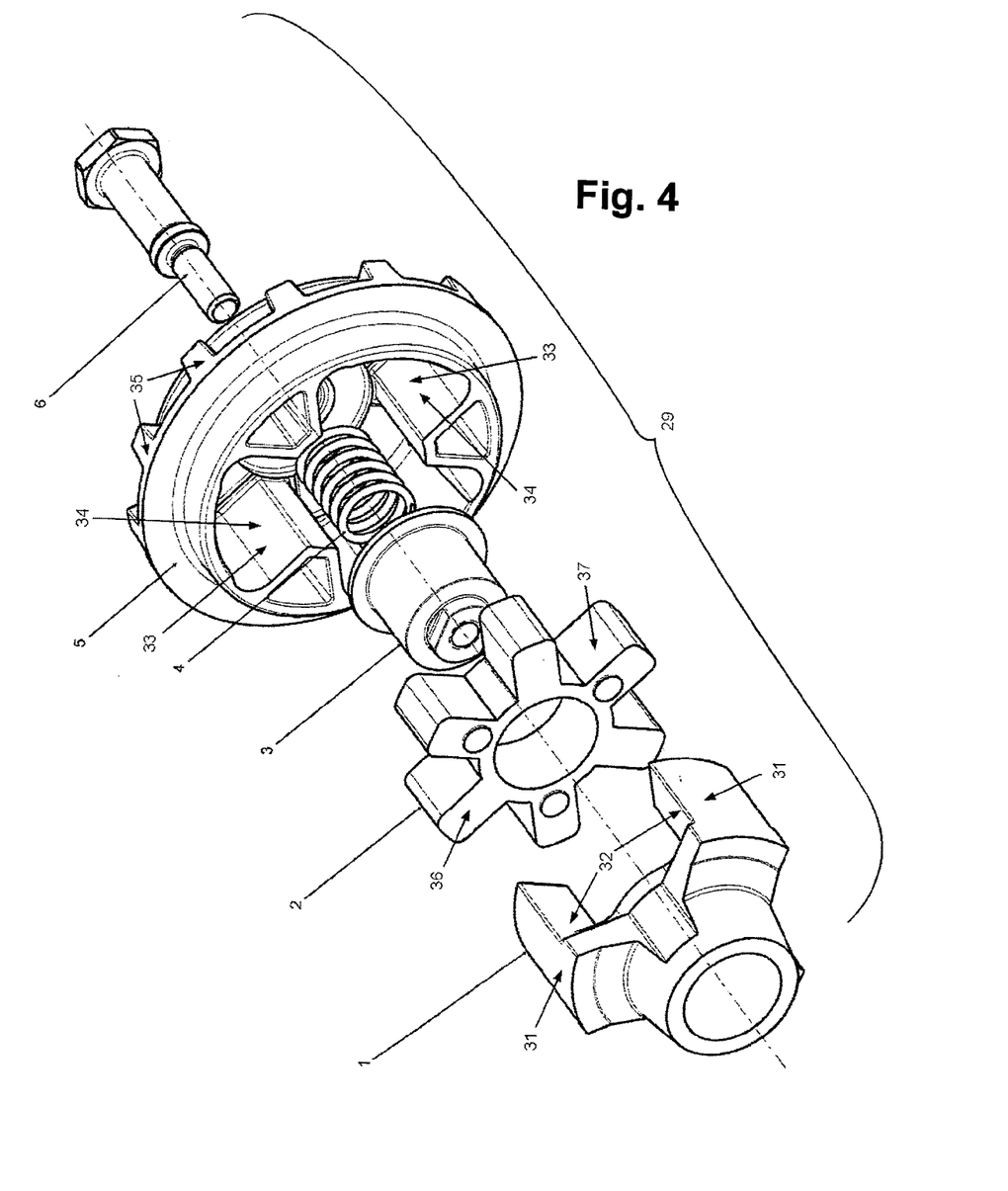
FIG. 4 is a view to any enlarged scale of the coupling half of FIG. 3, from the other end.
Figure 5:
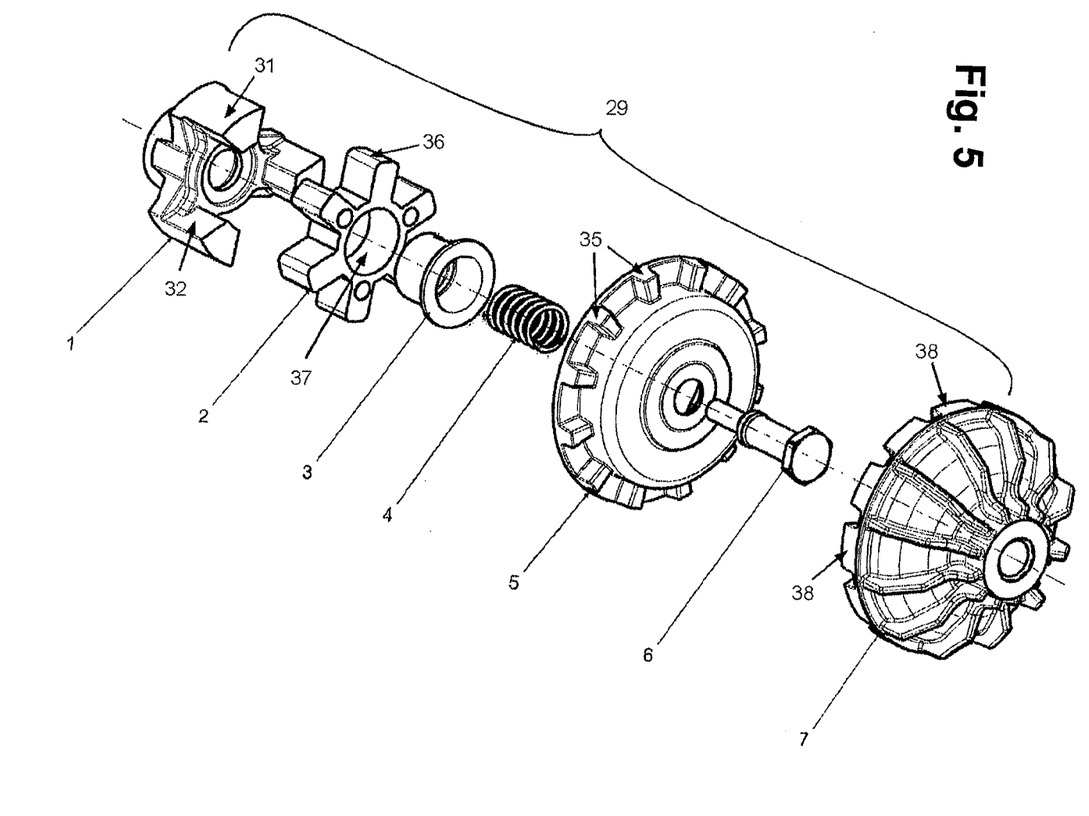
FIG. 5 is an exploded view of the coupling half of FIGS. 3 and 4 about to be brought into engagement with the dog clutch of the other coupling half moulded on an accessory.

FIGS. 3, 4 and 5 illustrate a coupling half 29 that is mounted on the power unit 20/engine 21, coaxially with crankshaft 30 (see FIG. 7) of the engine 21.

The engine coupling half 29 comprises a drive head 1 with three drive tines 31 located at 120° spacing and having radial drive surfaces 32 and adapted to penetrate three receiving apertures 33 having drive surface 34 in one side of dog clutch half 5 having its other side twelve teeth 35 at 30° spacing. Between the drive head 1 and the dog clutch half 5 is interposed a rubber component 3 having six projections 36 at 60° spacing and a central bore 37 through which passes a portion of a cup 31 in which is located a coil compression spring 39 one end of which bears on the bottom of the cup 31 and the other end of which bears on the dog clutch half 5, so that the dog clutch half 5 is resiliently mounted, whilst a bolt 46 secures the assembly to the crankshaft 30, as shown in FIG. 7.

Figure 6:
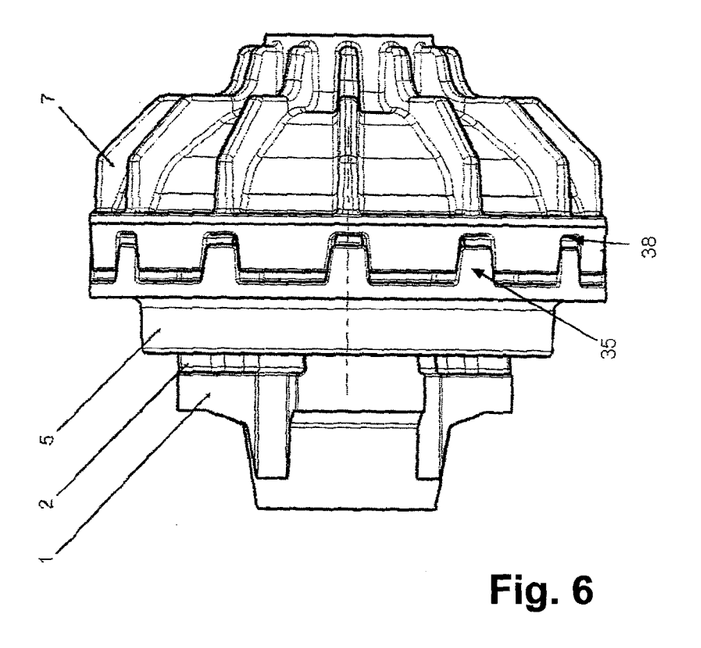
FIG. 6 shows the dog clutch halves engaged.
Figure 7:
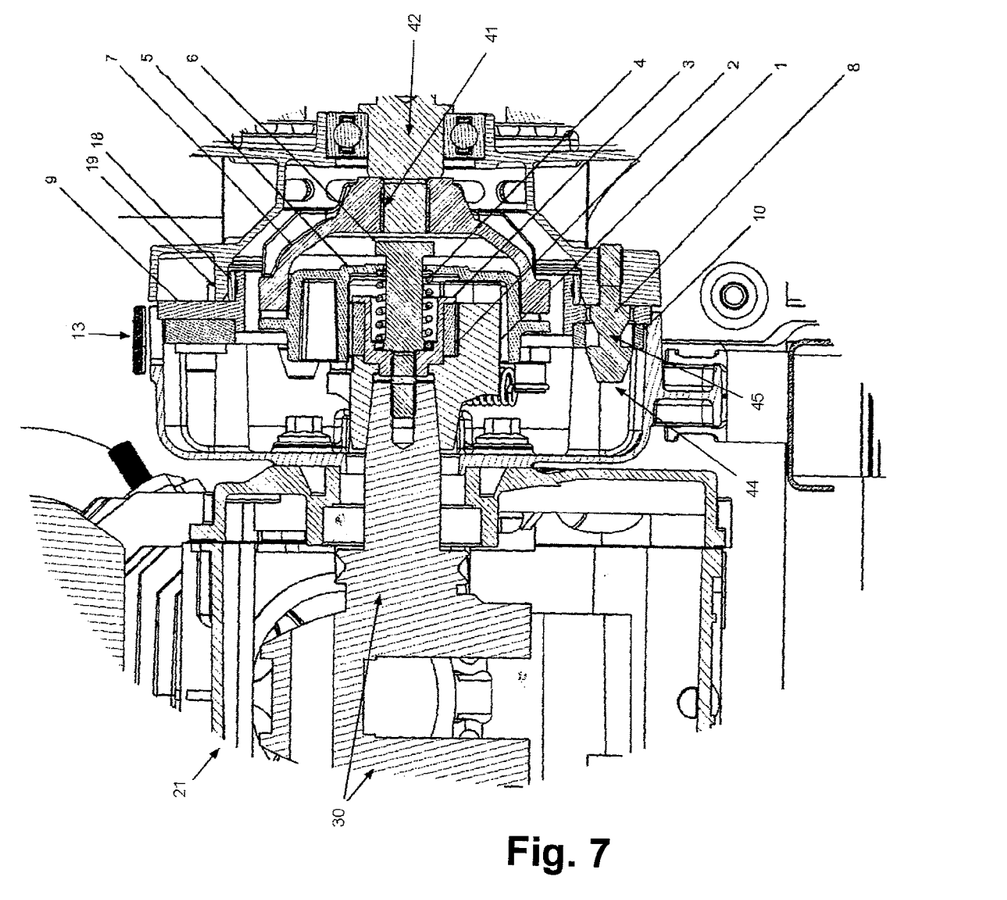
FIG. 7 is a sectional view through a coupled power unit and accessory.

As indicated in FIGS. 5, 6 and 7, to the accessory 16, 14, 17 is fitted the other half 7 of the dog clutch. The dog clutch half 7 is mounted on splines 41 of an input shaft 42 of the accessory 16, 14 or 17, and is provided with twelve recesses at 30° spacing each to receive a tooth 35.

To achieve coaxial alignment of the accessory 16, 14 or 17 and engine 21, the dog clutch half 5 is, in accordance with the first aspect of the invention, provided with an annulus ring 18 whilst the accessory is provided with a larger diameter annulus ring 19 such that the two rings engage with close tolerances, yet are readily separable when removal of an accessory is required. At least one ring engagement surface may be tapered, whilst a leading edge of the larger diameter ring 19 is chamfered to assist initial engagement. Upon engagement, if the relative rotary positions of the teeth 35 and recesses 38 are not aligned, this is of no consequence, as the dog clutch half 5, in accordance with the second aspect of the invention, is pushed inwardly against the bias of spring 4, with tooth engagement achieved automatically upon starting the engine 21, and the consequent rotation of dog clutch half 5.

Figure 8:
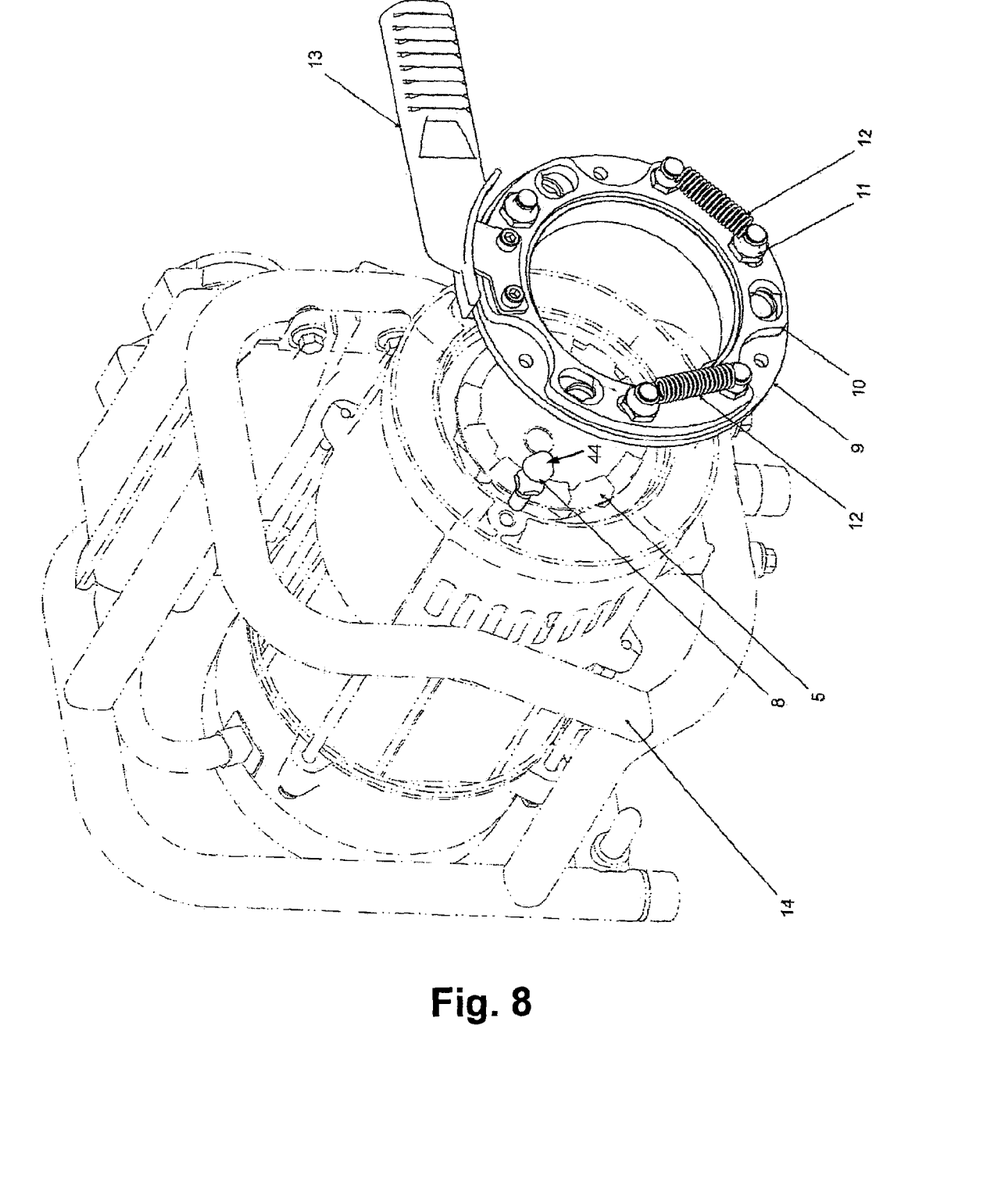
FIG. 8 is a perspective view detailing the latching arrangement.

To latch an accessory 16, 14 or 17 to the engine 21, two upper, and one lower mounting pins 8 are provided on each accessory. Each pin 8 comprises a tapered-lead-in nose 44 behind which is a neck 45. The noses each automatically engage an aperture 46 in a latching plate 9 the latter having a coaxial and rotatable disc 10 biased by springs 49 to a closure position and provided with three holes 50. During mounting of an accessory, the noses 44 rotate the plate 47 a few degrees anticlockwise (in FIG. 7) against the bias of springs 4, until after sufficient penetration, the arrival of the necks 45 permit the springs 49 to return the disc 10 clockwise. A manually operable handle 13 is mounted on the disc 10 to rotate the latter anticlockwise to release the pins 8, when detachment of the accessory is required.

Figure 2:
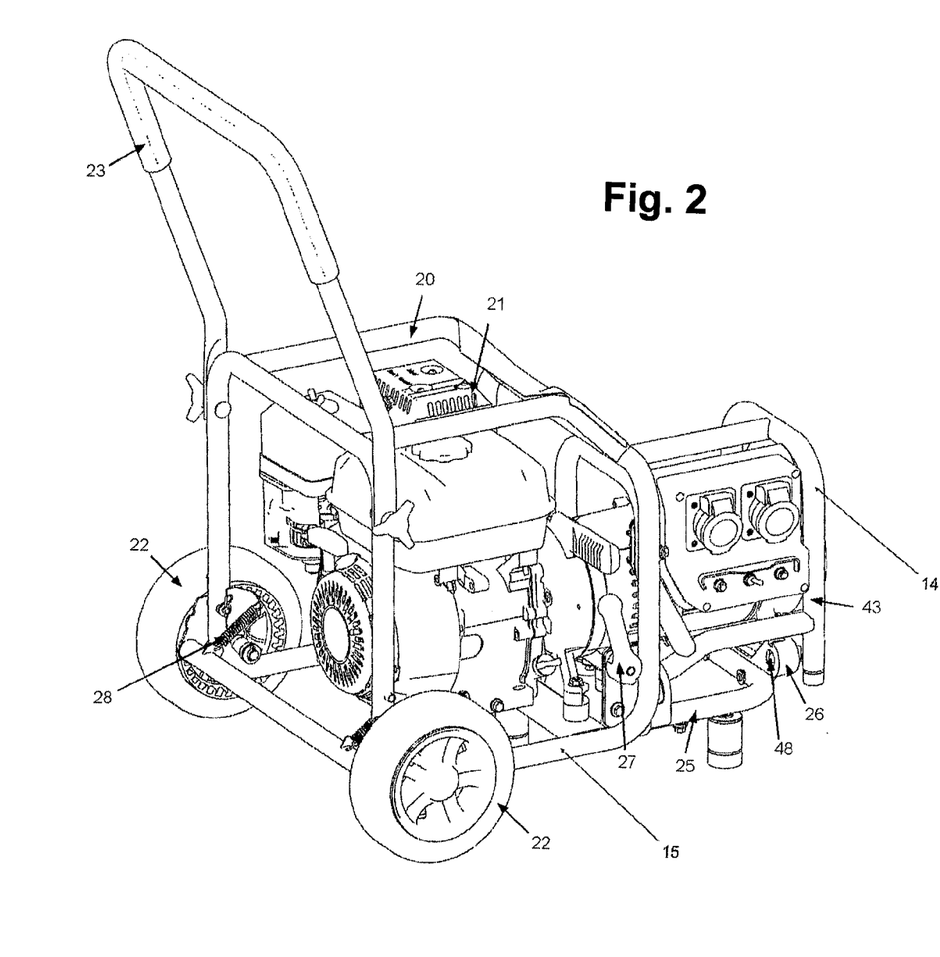
FIG. 2 is a perspective view of the rear and other side of the power unit of FIG. 1, with one accessory—the electric generator of FIG. 1—attached to the power unit.

For relatively lightweight accessories, the engagement of the rings 18, 19 and the three mounting pins 8 provide sufficient support for the accessory. If however, the accessory is relatively heavy, then a tubular frame 43 of the accessory is provided with a pair of spaced-apart pins 48 (FIG. 2) to engage the bushes 26 during the presentation and fitting of the accessory 16, 14 or 17 to the engine 21.

The invention claimed is:

1. A power take off coupling for connecting a power unit to a site accessory, comprising:
   (i) a resilient power transmission component within the coupling;
   (ii) a latching device to mechanically latch the accessory to the power unit, with a manually operable release means operable when unlatching is required;
   (iii) a power output shaft of the power unit carrying one half of a dog clutch with the other half carried by the accessory to be driven; and
   (iv) a power unit to site accessory alignment arrangement comprising a first annulus ring attached coaxially to an output shaft assembly of the power unit, and a second annulus ring attached coaxially to an input shaft assembly of the accessory to be driven, with the two rings being of different diameters such that one annulus ring is adapted to be engaged coaxially within the other annulus ring with close tolerances, and a leading edge of the larger diameter annulus ring is chamfered to assist initial engagement, such that the external periphery of the smaller diameter annulus ring engages at least parts of the internal periphery of the larger diameter annulus ring to provide for accurate coaxial alignment of the power output shaft of the power unit and the power input shaft of the accessory.

2. The coupling as claimed in claim 1, wherein each dog clutch half is formed as a die casting.

3. The coupling as claimed in claim 2, wherein the die castings are of aluminum alloy, preferably LM2.

4. The coupling as claimed in claim 1, wherein each dog clutch half is provided by a hub with dog clutch teeth on one side of the hub, and transmission teeth on the other side of the hub.

5. The coupling as claimed in claim 1, wherein the resilient component is located between a drive head, and the dog clutch half of the power unit.

6. The coupling as claimed in claim 1, wherein the resilient component is of rubber, of grade and formulation capable of accommodating repeated compression and relaxation and largely inert to temperature changes.

7. The coupling as claimed in claim 1, wherein the resilient component comprises six teeth, at 60° spacing, with each tooth on one side being adapted to seat on one drive surface of a tine of a drive head.

8. The coupling as claimed in claim 1, wherein the resilient component is fitted over a metallic component.

9. The coupling as claimed in claim 7, wherein six transmission drive teeth of the dog clutch half of the power unit, are adapted to interdigitate with the teeth of the resilient component.

10. The coupling as claimed in claim 1, wherein the teeth of at least one dog clutch half are tapered to aid mating interdigitation with the teeth of the other dog clutch half.

11. The coupling as claimed in claim 10, wherein the tooth taper is asymmetrical.

12. The coupling as claimed in claim 1, wherein the latching device is a positive mechanical latching device to hold the accessory firmly to the power unit, preventing movement both rotationally and axially.

13. The coupling as claimed in claim 1, wherein the latching device effects automatic latching when an accessory is coupled to the power unit.

14. The coupling as claimed in claim 1, wherein the latching device comprises an array of mounting holes, or projections provided in, or on a mounting plate for mating engagement with a corresponding plurality of projections or holes formed on or in an attachment plate of the accessory, with lead-in surfaces between the holes or projections to ensure both ease of engagement, and accurate alignment.

15. The coupling as claimed in claim 14, wherein the latching means comprises three mounting holes and three projections.

16. The coupling as claimed in claim 15, wherein the projections each comprise an enlarged head with a pilot, lead-in nose, with a neck portion behind the head.

17. The coupling as claimed in claim 16, wherein the neck portion of each pin is engaged by a spring biased, and radially displaceable lever carried by a latching plate mounted on the power unit.

18. The coupling as claimed in claim 17, wherein manual means are provided for displacing the levers against their spring bias when detachment of the accessory from the power unit is required.

19. The coupling as claimed in claim 14, wherein the projections comprise two upper projections, and one lower projection.

\* \* \* \* \*